Oct. 3, 1961  C. A. JERABEK ET AL  3,002,584
DUCTLESS AIR FILTER
Filed Nov. 24, 1958  4 Sheets-Sheet 1
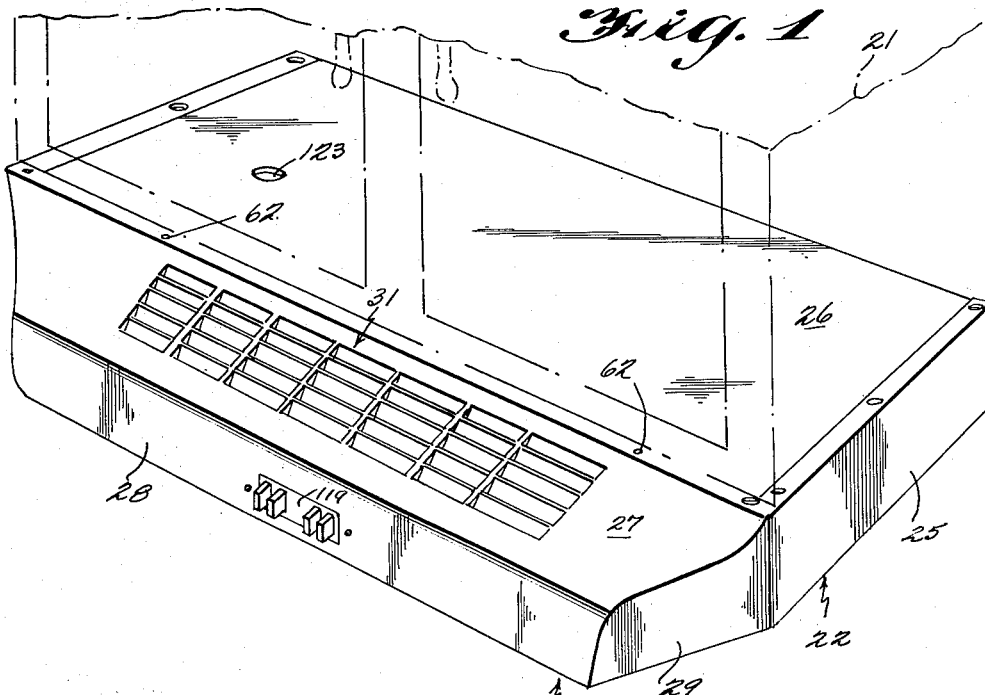
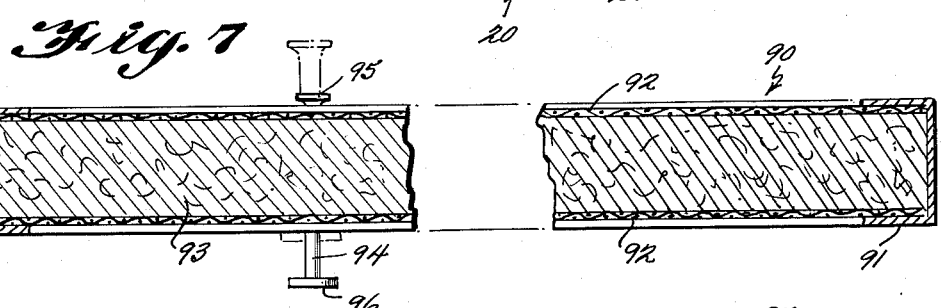
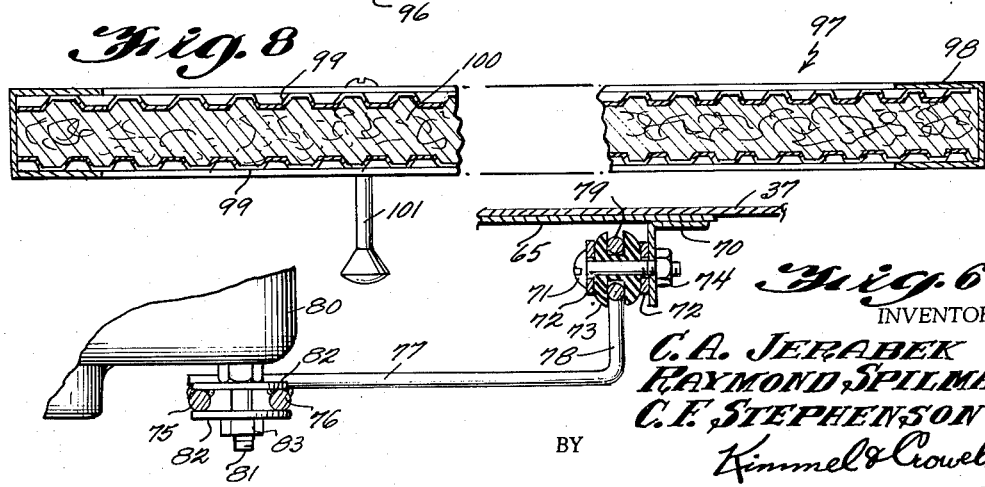
INVENTORS
C. A. JERABEK
RAYMOND SPILMAN
C. F. STEPHENSON
BY
Kimmel & Crowell
ATTORNEYS

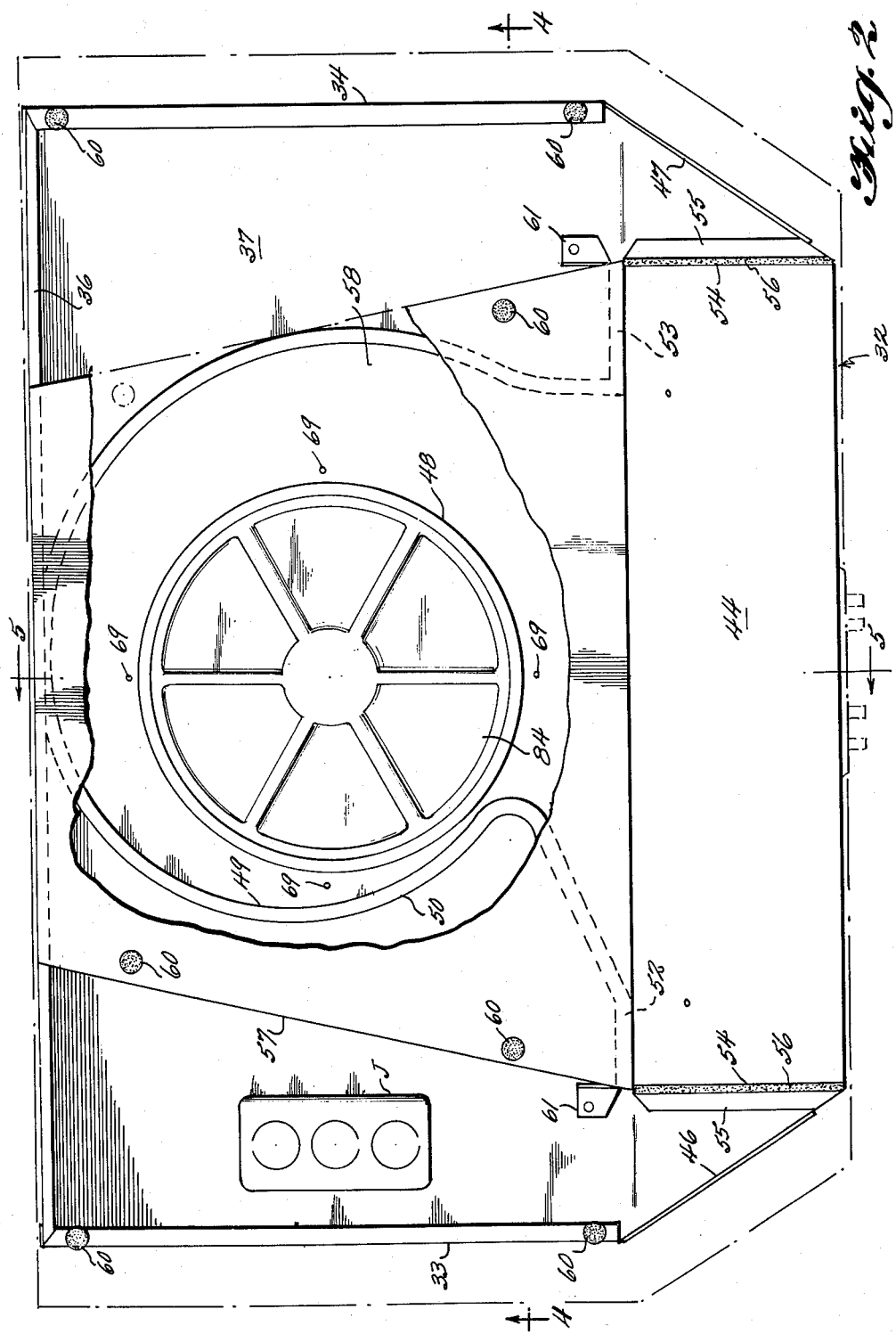

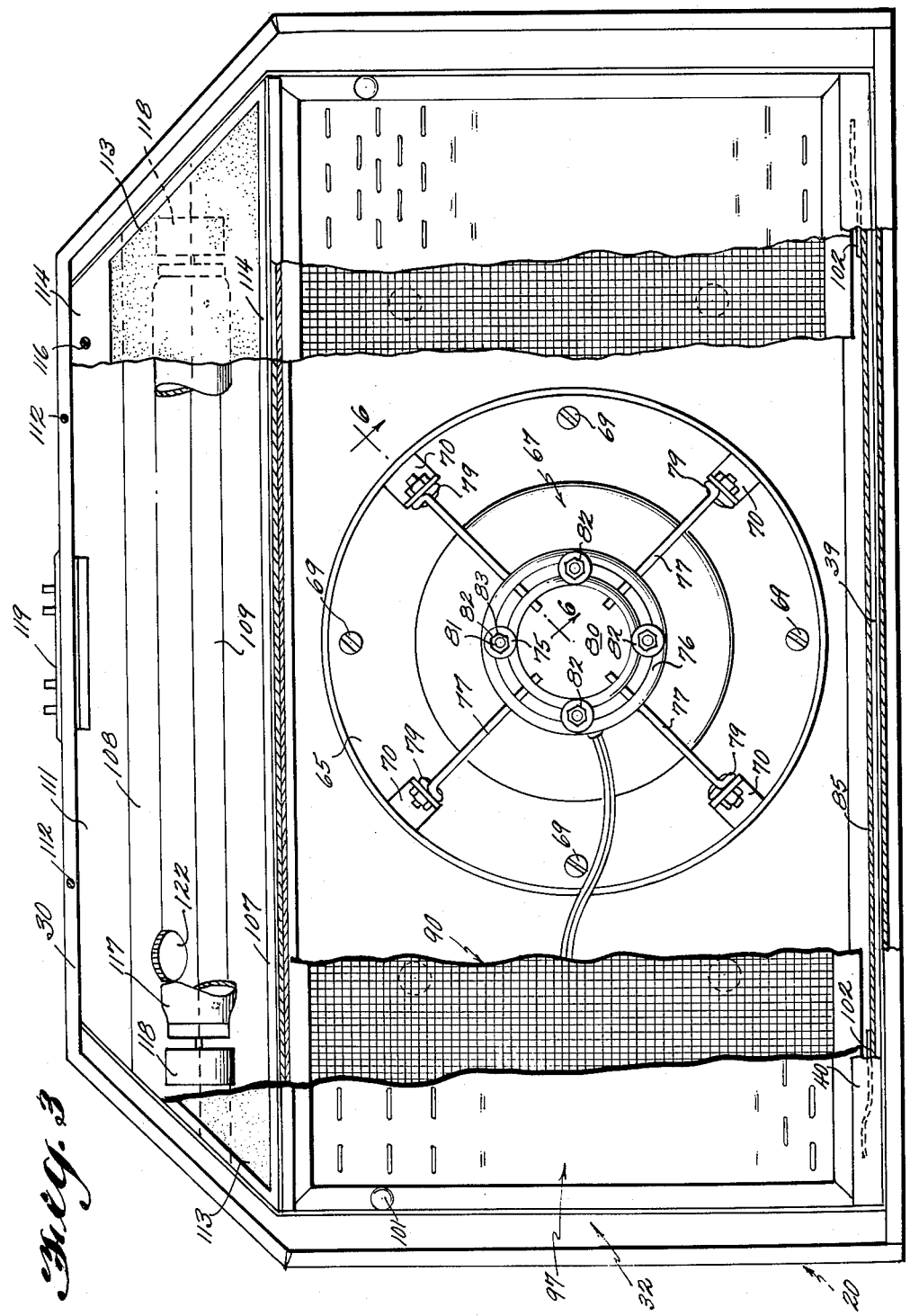

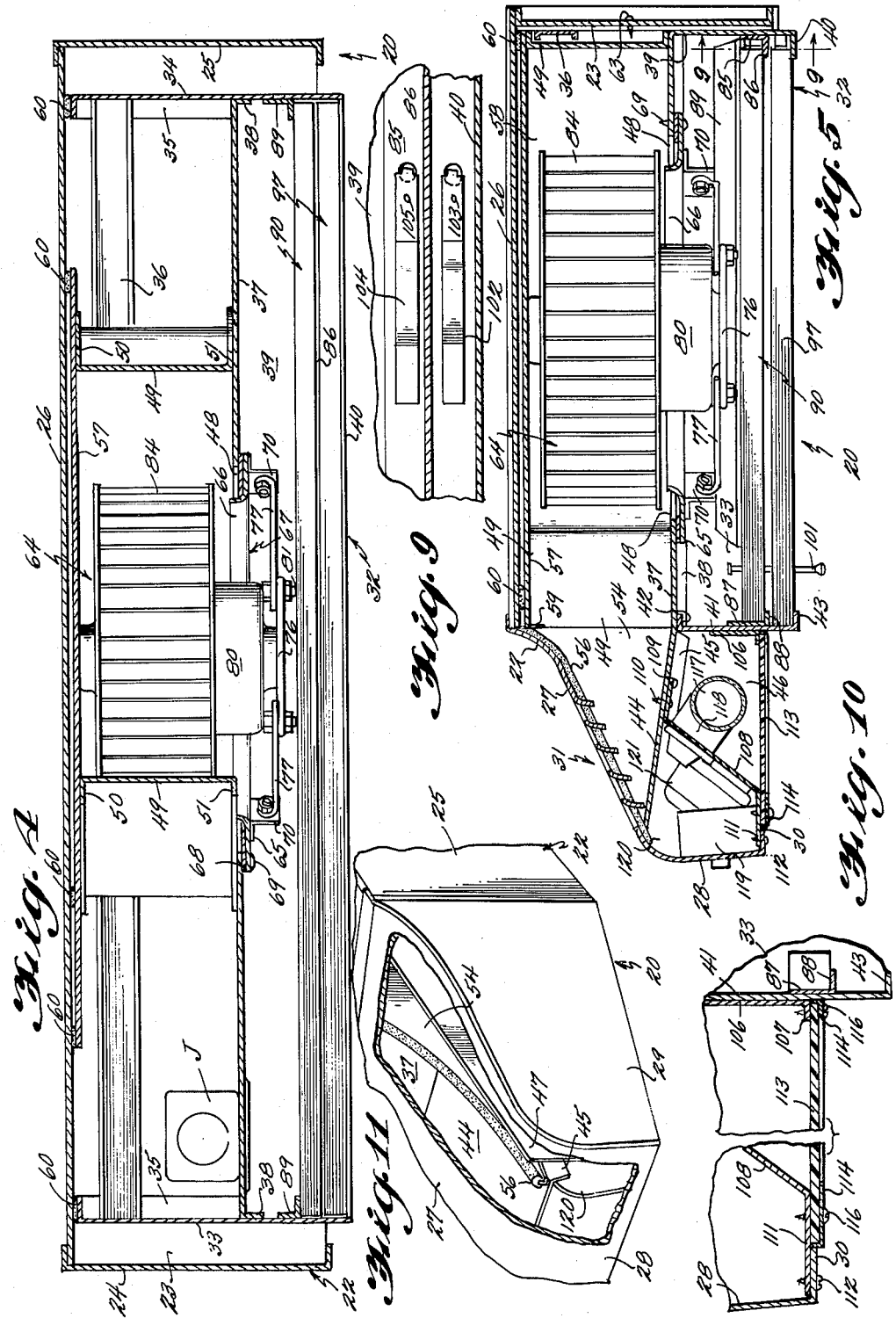

3,002,584
DUCTLESS AIR FILTER
Charles A. Jerabek, Bay Shore, N.Y., Raymond Spilman, Darien, Conn., and Charles F. Stephenson, New York, N.Y., assignors to Major Industries, Inc., Chicago, Ill.
Filed Nov. 24, 1958, Ser. No. 775,988
3 Claims. (Cl. 183—4.3)

The present invention relates to a ductless air filter and particularly to such an air filter arranged to overlie a stove.

Cooking stoves are usually provided with offtake hoods mounted thereover for drawing off the cooking odors and vapors so that they do not permeate the kitchen or other cooking area. Generally these hoods are of a type in which there is an extended canopy which projects a substantial distance outwardly of and above the stove, there being a suction or exhaust fan in the canopy and a vent from the fan to the exterior air. It is not always practical, and often is quite expensive, to provide such a vent. The present invention is directed to a hood of the type described with the exception that the exterior vent is omitted and the cooking odors and vapors are cleaned from the air by passing the air through filters prior to its discharge back into the room.

The primary object of the invention is to provide a ductless air filter structure in which air is cleaned of grease and has odors removed therefrom before returning to the room.

Another object of the invention is to provide a ductless air filter of the class described above in which separate grease removing panels and odor removing filter panels are positioned in aligned relation for the air to successively pass therethrough.

A further object of the invention is to provide an air filter of the class described above in which the filter panels may be quickly and easily removed for ready cleaning and replacement.

Another object of the invention is to provide an air filtering unit of the class described above having an air blower unit removably mounted therein.

Other objects and advantages will become apparent in the following specification when considered in light of the attached drawings, in which:

FIGURE 1 is a perspective view of the invention with the cabinets shown in broken lines;

FIGURE 2 is a top plan view of the invention shown partially broken away for convenience of illustration with the hood shown in broken lines;

FIGURE 3 is bottom plan view of the invention shown partially broken away and in section for convenience of illustration;

FIGURE 4 is a vertical longitudinal section taken along the line 4—4 of FIGURE 2, looking in the direction of the arrows;

FIGURE 5 is a transverse vertical section taken along the line 5—5 of FIGURE 2, looking in the direction of the arrows;

FIGURE 6 is an enlarged fragmentary vertical section taken along the line 6—6 of FIGURE 3, looking in the direction of the arrows;

FIGURE 7 is a fragmentary longitudinal section taken through the charcoal filter;

FIGURE 8 is a fragmentary longitudinal sectional view taken through the grease filter;

FIGURE 9 is a fragmentary vertical sectional view taken along the line 9—9 of FIGURE 5, looking in the direction of the arrows;

FIGURE 10 is an enlarged fragmentary sectional view similar to FIGURE 9, illustrating a detail of the invention; and FIGURE 11 is a fragmentary perspective view shown partiailly broken away and in section of one corner of the hood.

Referring now to the drawings in detail wherein like reference characters indicate like parts throughout the several figures, the reference numeral 20 indicates generally a ductless air filter of the type adapted to be affixed to the underside of a kitchen cabinet 21 to overlie a stove (not shown) positioned therebelow. The ductless filter 20 includes a hood, generally indicated at 22, having an upright rear wall 23, a pair of spaced apart side walls 24, 25, and a generally rectangular top wall 26 secured together by spot welding or the like. A downwardly and forwardly sloping upper front wall 27 extends from the forward edge of the top wall 26 and has a depending lower front wall 28 integrally secured to its forward lower edge. The side walls 24, 25 of the hood 22 have forwardly extending converging extensions 29 integrally formed thereon and secured to the opposite ends of the upper and lower front walls 27, 28, respectively. The lower front wall 28 is provided with a rearwardly extending horizontal flange 30, as can be seen in FIGURES 3, 5 and 10. The upper front wall 27 is provided with a generally rectangular grid opening, generally indicated at 31, for reasons to be assigned.

A filter unit, generally indicated at 32, is removably supported in the hood 22 and includes a pair of spaced apart parallel side walls 33, 34. The side walls 33, 34 are each provided with an inwardly extending vertical flange 35 connected by a longitudinally extending generally horizontal channel member 36 adjacent the upper ends thereof.

A generally horizontal partition wall 37 is provided with depending side flanges 38 on the opposite sides thereof which are secured to the side walls 33, 34. The partition wall 37 has a depending rear wall 39 formed integrally therewith and extending generally perpendicular thereto. The bottom edge of the rear wall 39 is provided with a forwardly extending generally horizontal flange 40, as can be best seen in FIGURE 5.

A forward wall 41 is arranged in spaced parallel relation to the rear wall 39 and is provided with an upper flange 42 secured to the front edge of the partition wall 37. The forward wall 41 is provided with a rearwardly extending flange 43 integrally formed on the lower edge thereof. The flange 43 lies in the same plane as the flange 40 and is somewhat shorter than the flange 40, for reasons to be assigned.

An upwardly sloping forward extension 44 is integrally formed on the forward edge of the partition wall 37 and is provided with flanges 45 on opposite ends thereof. The side walls 33, 34 are provided with forward extensions 46, 47 respectively secured to the flanges 45 on the extension 44.

The horizontal partition wall 37 is provided with a circular access opening 48 positioned centrally thereof. An upright arcuate wall 49 is provided with upper and lower outwardly extending horizontal flanges 50 and 51, respectively, and is supported on the horizontal partition 37. The arcuate wall 49 is provided with oppositely extending forward wing portions 52, 53, respectively, which extend along the forward edge of the partition wall 37.

A pair of generally triangular walls 54 are arranged in spaced apart parallel relation and provided with outwardly extending lower flanges 55 which are secured to the forward extension 44 of the partition wall 37. A channel shaped gasket 56 formed of flexible resilient material encompasses the upper edge of each of the triangular walls 54 to engage the lower surface of the upper front wall 27 of the hood 22 to prevent metal to metal contact between the triangular walls 54 and the hood 22.

A wall 57 is supported on the flange 50 of the arcuate wall 49 in spaced parallel relation to the partition wall 37 to form with the arcuate wall 49 and the partition wall 37 a blower chamber 58.

The horizontal wall 57 is provided with a depending strengthening flange 59 formed integrally with the front edge thereof.

A plurality of resilient cushions 60 are interposed between the hood 22 and the filter unit 32 to prevent vibration noises from being transmitted therebetween. A horizontal ear 61 is formed on the inner upper end of each of the triangular walls 54 to permit the passage of securing elements 62 therethrough which secure the hood 22 to the filter unit 32. Additional securing elements 63 fasten the rear wall 23 of the hood 22 to the flanges 35 of the side walls 33, 34.

A blower assembly, generally indicated at 64, is detachably secured to the horizontal partition wall 37 and includes a circular throat plate 65 having a circular upwardly and inwardly flared lip 66 surrounding a central opening 67 formed in the throat plate 65. An annular resilient gasket 68 is positioned between the upper surface of the throat plate 65 and the partition wall 37 to maintain them in spaced apart relation. Securing elements 69 extend through the throat plate 65, the gasket 68 and the horizontal partition wall 37 to detachably secure the throat plate 65 to the partition wall 37.

A plurality of depending ears 70 are secured to the throat plate 65 in circumferentially spaced relation, as best seen in FIGURES 3 and 4. A bolt 71 extends horizontally through the ear 70 supporting a pair of spaced apart washers 72 and an annularly grooved resilient grommet 73 positioned between the washers 72. A nut 74 secures the bolt 71 to the ear 70, as best illustrated in FIGURE 6.

A pair of horizontal concentric rings 75, 76 are positioned centrally of the throat plate 65 in underlying relation thereto. A plurality of radially extending rods 77 are welded to the rings 75, 76 and project outwardly therefrom. The rods 77 are each provided with upstanding offset integral end portions 78 on their outer ends. Rings 79 are integrally formed on the upper ends of the upstanding portions 78. The rings 79 are seated in the annularly grooved grommets 73 so as to support the concentric rings 75, 76 from the throat plate 65 centrally of the opening 67.

An upright electric motor 80 is supported on the concentric rings 75, 76 and is provided with a plurality of mounting bolts 81 which extend downwardly between the concentric rings 75, 76, as best shown in FIGURE 6. Washers 82 are positioned on mounting bolts 81 on opposite sides of the concentric rings 75, 76 and a nut 83 is threaded on to the lower ends of the mounting bolts 81, securing the motor 80 tightly thereto. A cylindrical centrifugal blower 84 is positioned above the throat plate 65 and is supported on the motor 80 to be driven thereby. The blower 84 is positioned within the blower chamber 58 and when rotated by the motor 80, draws air upwardly through the opening 67 in the throat plate 65 moving the air forwardly and out through the grid 31 in the upper front wall 27 of the hood 22. The blower unit 64 may be bodily removed from the filter unit 32 by removing the securing elements 69 holding the throat plate 65 to the partition wall 37 and dropping the cylindrical blower 84 through the opening 48 in the partition wall 37.

An angle iron support 85 is secured to the forward face of the rear wall 39 and carries a horizontal flange 86 thereon which is arranged in upwardly spaced parallel relation to the flange 40 on the rear wall 39. An angle iron support 87 is secured to the rear face of the forward wall 41 and is provided with a rearwardly extending horizontal flange 88 arranged in upwardly spaced parallel relation to the flange 43 on the forward wall 41. The flange 86 has the same width as the flange 40 and the flange 88 has the same width as the flange 43. An angle iron stop 89 is secured to the inner face of each of the side walls 33, 34 in upwardly spaced relation with respect to the flanges 86, 88.

A charcoal filter, generally indicated at 90, includes a generally rectangular channel frame 91 and a pair of spaced apart parallel screen retaining panels 92. Activated charcoal 93 is arranged between the panels 92 and is held in place thereby. A pair of shafts 94 are arranged on opposite ends of the charcoal filter 90 and are adapted for vertical sliding movement therethrough, as illustrated in dotted lines in FIGURE 7. The shaft 94 is peened at 95 on its upper end and provided with a knob 96 on its lower end to provide a means for handling the filter 90 when installing it and removing it from the filter unit 32.

A grease filter, generally indicated at 97, includes a generally rectangular channel frame 98 and a pair of spaced apart parallel expanded metal panels 99 supported therein. A metal sponge material 100 is positioned between the expanded metal panels 99, as is best shown in FIGURE 8. A handle 101 is secured to the channel frame 98 on opposite ends thereof to provide means for handling the filter 97 when removing it and replacing it in the filter unit 32.

A generally flat metal spring 102 is secured to the rear wall 39 between the flanges 40 and 86 by means of a rivet 103. A second generally flat spring 104 is secured to the angle iron bracket 85 immediately above the flange 86 by means of a rivet 105. As can be seen in FIGURE 3, a pair of springs 102 are arranged at opposite ends of the filter unit 32 and a pair of the springs 104 are arranged adjacent thereto. As noted above, the flanges 40 and 86 are wider than the flanges 43, 88, respectively, so that in mounting the filter 90 in the filter unit 32 the rear edge of the filter 90 is first supported on the flange 86 and then pressed rearwardly against the tension of the springs 104. With the filter 90 in rearwardly pressed position, the forward edge is swung upwardly into alignment with the flange 88 and is slid forwardly until supported on the flange 88. The springs 104 bias the filter 90 forwardly to prevent its disengagement from the flanges 88, 86, due to vibration. The angle iron stops 89 prevent the filter 90 from being moved upwardly in the filter unit 32 due to the movement of air therethrough. The grease filter 97 is mounted in space parallel relation below the filter 90 by first supporting the rear edge of the filter 97 on the flange 40 and moving it rearwardly to compress the springs 102. The filter 97 is then swung upwardly until it is in alignment with the flange 43 and is then slid forwardly until it is supported by the flange 43 at its forward edge. The springs 102 prevent the filter 97 from disengaging from the flanges 43, 40 due to vibration.

A longitudinally extending plate 106 is secured to the forward face of the forward wall 41 and is provided with a forwardly extending horizontal flange 107 parallel and spaced slightly above flange 30 on the hood 22.

A downwardly and forwardly sloping partition 108 is provided with a rearwardly extending flange 109 on its upper rear end with the flange 109 in contact with the forward extension 44 on the undersurface thereof. Securing elements 110 detachably secure the flange 109 to the extension 44, as best seen in FIGURE 5. The partition 108 is provided with a forwardly extending generally horizontal flange 111 on its forward lower end with the flange 111 being arranged in generally aligned relation to the flange 107. The flange 30 of the hood 22 engages beneath the flange 111 and is secured thereto by securing elements 112. An elongated generally horizontal translucent plastic panel 113 engages the underside of the flanges 107, 111 and is provided with a frame member 114 which encompasses the peripheral edges thereof. Detachable securing elements 116 extend through the frame member 114, the panel 113 and into the flanges 107, 111 to detachably secure the panel 113 to the flanges 107, 111 and the frame member 114 to the panel 113.

A fluorescent tube 117 is supported from the partition 108 on conventional sockets 118 secured to the partition 108. A push button switchbox 119 is secured to the lower forward wall 28 of the hood 22. The opposite ends of the partition 108 are provided with forwardly extending perpendicularly offset end walls 120 which engage against the underside of the extension 44 and the rear face of the lower front wall 28. A ballast 121 is secured to the partition 108 between the partition 108 and the lower front wall 28. A starter 122 is supported on the partition 108 and extends therethrough for outside access when required. An electric junction box J is secured to the horizontal partition wall 37 to provide a junction point for the electric wires carrying current to the various parts of the device. A bore 123 is provided in the top wall 26 of the hood 22 to permit an electric cable (not shown) to extend therethrough for connection to a source of electricity.

In the use and operation of the invention, the blower unit 64 is mounted to the filter unit 32 and the hood 22 is then secured to the filter unit 32. The partition 108, translucent panel 113 and fluorescent tube 117 are connected to the hood 22 and filter unit 32 and, lastly, the charcoal filter 90 and the grease filter 97 are assembled into position as described above. The complete assembled device 20 is then secured to the underside of kitchen cabinets 21 or is supported by any desired brackets or supports in operative position.

In the operation of the device the blower 84 draws air through the grease filter 97 and then through the charcoal filter 90 upwardly through the opening 67, moving the air outwardly through the grid 31 in the upper front wall 27. When necessary to clean or repair the blower unit 64, it is bodily removed from the filter unit 32 by first removing the filters 90, 97 and then disconnecting the throat plate 65 from the partition wall 37 to permit the blower unit 64 to be lowered out of the filter unit 32. Obviously, the filters 90, 97 may be changed as required.

Having thus described the preferred embodiment of the invention, it should be understood that numerous structural modifications and adaptations may be restored to without departing from the scope of the appended claims.

What is claimed is:

1. A ductless air filter comprising a hood including a rear wall, end walls and a top wall, said hood having an open bottom, means for securing said hood in operative position overlying a stove or the like, an extension on the front of said hood, said extension having a forwardly and downwardly inclined top portion having a grid opening therein, a horizontal plate extending transversely across an intermediate portion of said hood, said plate having a relatively large central opening therein, a horizontally disposed blower, an electric motor secured concentrically to said blower and extending into said opening in said plate, means detachably securing said motor and said blower to said plate, a curved baffle extending vertically between said plate and said top wall and having an opening into said extension adjacent said grid opening, and filter means releasably secured in the open bottom of said hood beneath said blower completely closing said open bottom, upper and lower flanges at the lower end of said rear wall, resilient means in said rear wall adjacent each of said flanges, corresponding upper and lower flanges at the inner bottom of said extension in confronting relation with said first-mentioned upper and lower flanges, an activated charcoal filter positioned on said upper flanges, and a second metal sponge filter unit positioned on said lower flanges, said units being held against displacement by said resilient means.

2. The structure of claim 1 wherein said activated charcoal filter comprises a unit formed of a pair of spaced-apart parallel screen retaining panels having activated charcoal therebetween and a generally rectangular channel frame surrounding said screen retaining plates, and wherein said metal sponge filter comprises a unit formed of a pair of parallel perforate metal plates having metal sponge material therebetween, and a channel frame surrounding said metal plates.

3. The structure of Claim 2 wherein vertically extending handles are provided extending through opposite edges of each filter unit to facilitate positioning said units on said flanges, the handles on the uppermost of said filter units being vertically movable relative to said uppermost filter unit to permit insertion and removal of the lower filter unit.

References Cited in the file of this patent
UNITED STATES PATENTS

| | | |
|---|---|---|
| 1,746,283 | Reed | Feb. 11, 1930 |
| 2,043,298 | Markels | June 9, 1936 |
| 2,530,535 | Mulhollen | Nov. 21, 1950 |
| 2,628,083 | Rense | Feb. 10, 1953 |
| 2,886,124 | Scharmer | May 12, 1959 |